Feb. 27, 1968  B. L. RASKIN  3,371,053
MULTICELLULAR PLASTIC PARTICLES AND DISPERSIONS THEREOF
Filed Aug. 9, 1965  2 Sheets-Sheet 1

*INVENTOR*
BETTY LOU RASKIN

Feb. 27, 1968 B. L. RASKIN 3,371,053
MULTICELLULAR PLASTIC PARTICLES AND DISPERSIONS THEREOF
Filed Aug. 9, 1965 2 Sheets-Sheet 2

INVENTOR
BETTY LOU RASKIN

BY Larson and Taylor

ATTORNEYS

United States Patent Office 3,371,053
Patented Feb. 27, 1968

3,371,053
MULTICELLULAR PLASTIC PARTICLES
AND DISPERSIONS THEREOF
Betty Lou Raskin, 6221 Greenspring Ave.,
Baltimore, Md. 21209
Filed Aug. 9, 1965, Ser. No. 482,986
15 Claims. (Cl. 260—2.5)

ABSTRACT OF THE DISCLOSURE

Multicellular, solid, substantially spherical polymeric organoplastic particles having a particle size of from one to one thousand microns and aerosols of such particles, are produced by injecting a composition capable of forming a solid polymeric organoplastic foam into a high velocity gas stream. The multicellular particles can be recovered from the aerosol so produced.

This application is a continuation-in-part of my application Ser. No. 207,729, filed July 5, 1962, now abandoned, which is a continuation-in-part of my applications Ser. No. 7,568 filed Feb. 9, 1960, and Ser. No. 798,959, filed Mar. 12, 1959, both of which are now abandoned.

This invention relates to multicellular plastic particles, to dispersions of such particles in air and other gases and to methods of making the particles and dispersions.

I have found that when a composition capable of forming a polymeric organoplastic foam is introduced into a rapidly moving stream of gas which has a temperature above the foam-developing temeprature of the composition, a dispersion of multicellular polymeric organoplastic particles is formed which may be utilized as such and from which multicellular plastic particles of the invention may be separated by suitable means. This composition comprises a polymeric material or suitable starting materials or reactants which are capable of forming such polymeric material, and which polymers or starting materials respectively, are, due to their composition or due to the presence of a suitable adjuvant, capable of foaming or expanding.

The method of the invention not only makes it possible to vary the size and density of the multicellular plastic particles independently over wide ranges but it also permits other characteristics of the particles such as color, surface reflectance, hygroscopicity and the like to be varied independently of the size and density of the particles.

The expanding or blowing component of the foam-forming compositions may be added to the plastic foam-forming compositions as such; it may be generated by a reaction, such as a condensation reaction, between components of the plastic foam-forming composition; or it may be generated by the reaction of components added to the composition for this purpose alone, all of which is well known in the art of producing plastic foams and will be more particularly described hereinafter. The word "blowing agent" as used hereinafter is understood to include such expanding or blowing components.

In general, foam-forming compositions are known to produce virtually any type of polymeric organoplastic in foam form. In accordance with the present invention, such foam-forming compositions may be utilized to produce aerosols and particles. Some types of compositions may be utilized in a variety of ways, and this fact greatly adds to the adaptability of the invention to a wide variety of materials and uses. For example, blowing agents which expand by evaporation, such as water, acetone, methyl chloride and other chlorinated and/or fluorinated lower hydrocarbons, or blowing agents which decompose on heating with the formation of gases, such as organic azo and nitroso compounds, are particularly useful in imparting foaming properties to compositions such as vinyl chlorides, phenolformaldehydes, urethanes and styrenes which form thermoplastic and thermosetting polymers. The organic isocyanates are also useful foaming agents in various types of plastic wherein they react, for example, with alcoholic or carboxylic acid components, with the formation of carbon dioxide. Instead of, or in addition to, the agents mentioned above, air or other gas such as helium may be whipped into a foam-forming composition, such as phenol-formaldehyde or polyvinyl chloride, which is then injected into the gas stream where it is hardened by the action of the heat of the gas stream, which may be aided by the addition of a polymerization catalyst or hardening agent.

Blowing agents which react with other substances to produce gases may also be used, for example, ammonium salts which liberate ammonia when reacted with bases such as potassium hydroxide. One or more solid, liquid, or gaseous blowing agents may be used alone or in combination or in association with other solids, liquids, or gases. The nature of the gas stream may be such that it, too, may in some chemical way contribute to the formation of the multicellular plastic particles. For example, it may enhance hte polymerization, expansion, foaming, or curing of the particles. The foaming agents or a portion thereof may also be injected into the foam-forming compositions in the conduit by which the compositions are conveyed into the gas stream.

Another example of the variety of ways in which the compositions may be utilized is to control the amount of certain components and/or the type of curing or hardening so that when the particles or aerosols are produced they are still somewhat tacky, though solid, and may adhere to a particular surface before becoming fully cured or hardened. For example, this technique can be used to coat glass and paper with partially-cured multicellular particles of urethane foam without the use of special adhesives. The amount of amine catalyst ordinarily used in this type of composition to produce fully cured multicellular particles of urethane foam may be reduced so as to produce the desired effect.

These and other illustrative compositions capable of forming polymeric organoplastic foams useful in the practice of the invention are described in the following U.S. patents:

Thermoplastic polymers:
- 2,737,503—Sprague et al.
- 2,744,076—Breuer et al.
- 2,776,265—Fuller.
- 2,797,443—Carlson.
- 2,804,435—Reed.
- 2,816,827—Roth.

Urea-formaldehyde:
- 2,789,095—Lindvig.

Phenolics:
- 2,446,429—Nelson et al.
- 2,608,536—Sterling.
- 2,653,139—Sterling.
- 2,744,875—Thomas et al.
- 2,772,246—Simon et al.
- 2,798,054—Simon et al.
- 2,802,240—Thomas.

Isocyanate-containing compositions:
- 2,577,279—Simon et al.
- 2,577,280—Simon et al.
- 2,577,381—Stirnemann.
- 2,602,783—Simon et al.
- 2,642,403—Simon et al.
- 2,698,838—Simon et al.
- 2,706,311—Durst et al.

Isocyanate-containing compositions:
   2,740,743—Pace.
   2,787,601—Detrick et al.
   2,788,335—Barthel.
   2,802,795—Simon et al.
   2,842,506—Roussel.
   2,846,408—Brochhagen et al.
Epoxy resins:
   2,739,134—Parry et al.
   2,831,820—Aase et al.
Silicones:
   2,813,839—Rust et al.
   2,833,732—Weyer.

Filler and pigment components incorporated in some of the compositions of the patents cited above will usually be omitted from the compositions for the purpose of the present invention, but these and other filler and pigments, as well as other ingredients, such as fire retarding materials, may be added to the compositions to vary the properties of the dispersions or of the dispersed particles for particular purposes. For example, the addition of finely divided flake metallic pigments, such as aluminum flake, may be added to vary the reflectance of the smoke or the separated particles to light or other radiation.

The stream of gas into which the compositions capable of forming multicellular polymeric organoplastic particles are injected may be provided in a variety of ways. Gas turbines of the portable type provide a very advantageous source of gases for use in making cellular plastic particles by the method of the invention at any desired location. However, exhaust gases from internal combustion engines, jet, turbojet, and rocket motors may be used. The source of the gas stream is not important except as a matter of convenience and economy. The temperature of the gas stream must, of course, be sufficient to effect or sustain the foam-forming reaction.

Typically, the foam-forming composition is injected into the gas stream in liquid form, either in a single stream or in two or more streams each containing the same or different components of the foam-forming composition. According to the character of the composition, normally solid compositions or components may be liquefied by warming, by adding solvents thereto, or a liquid or finely divided solid composition may be dispersed in a carrier liquid or gas and injected or blown into the hot gas stream.

The theory by which multicellular plastic particles are made according to the present invention has not been ascertained. However, it has been determined that by injecting the foam-forming compositions into a stream of gas which moves at least at approximately sonic velocity, multicellular particles are produced. Thus, while it is quite possible that a more basic physical principle is responsible for formation of multicellular particles, that result has been found to occur when, according to the invention, sonic or substantially sonic velocities are employed.

The multicellular plastic particles may be separated from the carrier gas by any of a variety of means such as centrifugal or cyclone separators, bag filters, electrical precipitators and the like. The choice of separating devices will depend to some extent on the character of the particles and of the carrier gases but in general the type of separator will not be critical.

Illustrative examples of the method of the invention will be more particularly described with reference to the accompanying drawings wherein.

Figure 1:
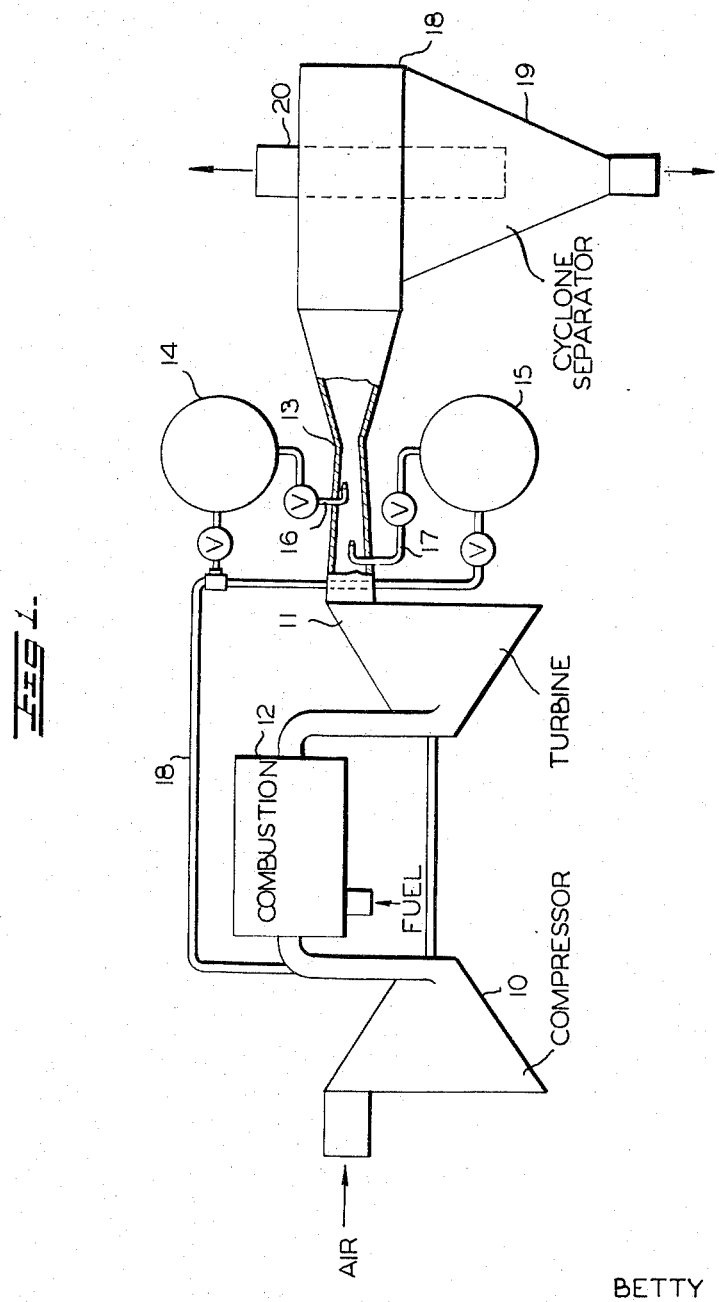
FIG. 1 is a diagrammatic representation of apparatus suitable for use in practicing the method of the invention.

In FIG. 1, 10 is a compressor and 11 is a turbine on the same shaft therewith, with a combustion chamber 12 heating compressed air from the compressor on the way to the turbine in accordance with the common arrangement. Hot exhaust gases from the turbine pass through venturi 13. Tanks 14 and 15 contain liquid-foam-forming compositions or components thereof. Tanks 14 and 15 are supplied with compressed air through line 21 which serves to force the contents of the tanks through lines 16 and 17 into venturi passage 13 wherein the compositions are brought to foaming temperature and are converted into dispersions of fine multicellular particles of foamed plastic.

Figure 2:
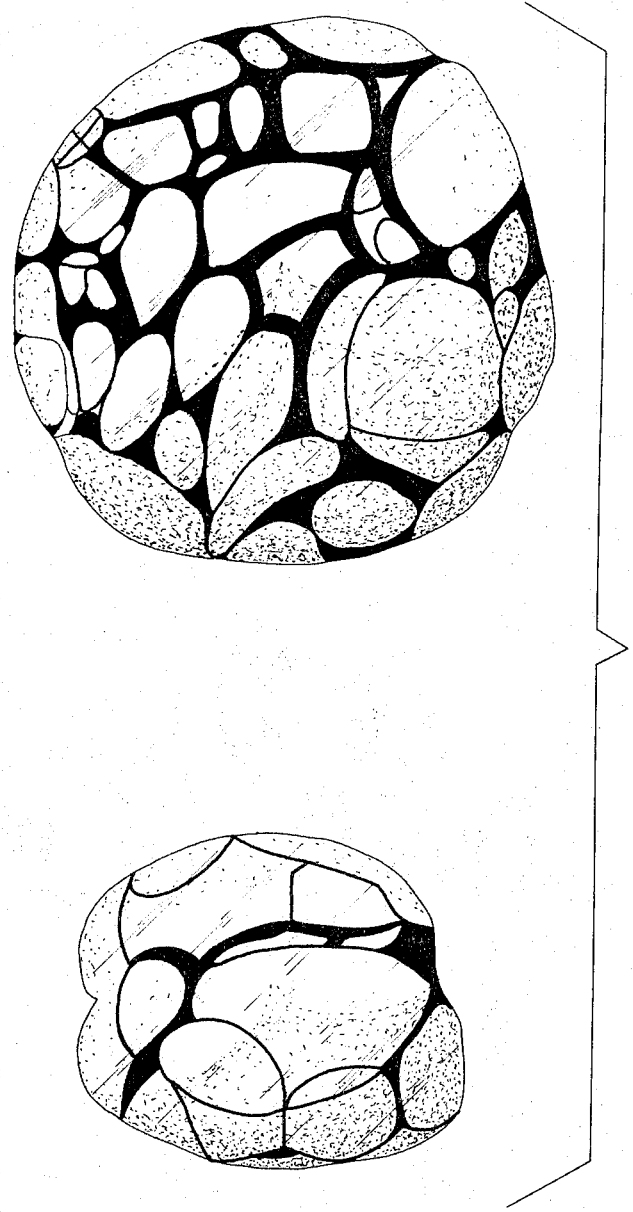
FIG. 2 is a perspective view of muticellular particles of the invention showing closed-cell type particles based on photographs thereof.

The gaseous dispersions thus formed may be conducted tangentially into cyclone separator 18, wherein the particles are separated by centrifugal action, the particles being deposited in hopper 19 and the carrier gases passing out through outlet tube 20. The collected particles are spherical, or at least substantially so. Furthermore, as shown in FIGURE 2, each particle is multicellular with a plurality of hollow cells therein. In some cases, as shown in FIGURE 2, the several hollow cells are mostly closed whereas, in other cases, the several cells may be partially or fully open. In either event, however, the particles are multicellular and have an interior composed of an interconnected network of the plastic material formed by the juncture of adjacent cells.

The following specific examples are illustrative of the principles of the invention:

*Example I*

One hundred pounds of a thermosetting, partially-reacted phenol aldehyde resin (made by heating one mol of phenol with two and one-half mols of formaldehyde, as 40% aqueous solution, in the presence of 0.05 mol of sodium hydroxide for two hours at about 80–85° C., neutralizing with lactic acid and dehydrating under vacuum to about 10% of water) is mixed with seven pounds of isopropyl ether, and one pound of Tween 40 wetting agent (polyoxyalkylene ether of sorbitan monopalmitate) in tank 14 of the apparatus of the drawing and a catalyst composition of 50 parts of 66° Bé. sulfuric acid and 7 parts of 85% phosphoric acid in 50 parts of water are placed in tank 15.

The compressor-turbine system is started up and adjusted to give a stream of exhaust gases at about 900° F. at a velocity of about 1,075 ft. per second. When the resin mixture and the catalyst composition are fed into the venturi section at the rate of about 22 parts of the catalyst composition to 100 parts of the resin mixture, a dispersion is formed from which pinkish spherical multicellular particles of phenolic plastic are collected in the cyclone separator. The collected particles are partly open celled and partly closed celled. They range from about 5 to about 1,000 microns in diameter with an average diameter of about 70 microns. The bulk density of the particles is about 0.01 gram per cc.

FIG. 2 is a greatly enlarged reproduction of an illustrative group of multicellular phenol formaldehyde plastic particles produced by the procedure of Example I, but shown as being of fully closed cell configuration.

*Example II*

When furfuryl alcohol is added to the resin composition of Example I in the proportion of 10 parts of furfuryl alcohol and 6 parts of isopropyl alcohol to 84 parts of the phenol-formaldehyde resin and the composition is injected into the hot exhaust gas stream as in Example I, black multicellular plastic particles are collected in the separator.

*Example III*

When a two-component urethane foam composition consisting, as to component A in tank 14, of 78.8 parts of an isocyanate terminated polyether prepolymer and 21.2 parts of trichlorofluoromethane, and, as to component B in tank 15, of 66.4 parts of a polyether resin containing a polypropyleneoxide chain, 20.7 parts of trichlorofluoromethane and 3.3 parts of triethylamine as catalyst, is fed to the venturi section of the apparatus of the drawing as described in Example I, white multicellular plastic particles are produced. The collected particles are of closed cell structure and consist of clusters up to about 700 microns in diameter of closed cell particles about 12 to 20 microns in diameter. Increasing the proportion of catalyst increases the degree of expansion of the particles.

The trichlorofluoromethane reduces the viscosity of the liquid components and also acts as a blowing agent.

*Example IV*

Carbon dioxide at 300 to 400 pounds pressure is whipped into a mixture of 100 parts of polyvinylchloride and 100 parts of tricresyl phosphate and the mixture is sprayed into a hot gas stream as described in Example I. Multicellular particles of polyvinylchloride are collected in the separator.

The density of the multicellular particles can be varied by varying the nature and proportion of the resin or resin-forming composition and the blowing agent, the reaction temperature and other variables. It is possible to produce multicellular plastic particles having a density as low as or lower than that of air (0.0012 gm./cc.). This makes possible the production of dispersions of low fall-out rates with particles of relatively large size.

While the relative volume of the hot carrier gas stream does not appear to be critical, the temperature must be high enough to effect a rapid formation of foam, and both relative volume and temperature may affect the size and density of the particles. By variation of the temperature and volume relationships, design of the injection nozzles, and the character and amount of the blowing agents, it is possible to vary the size and density of the particles over a wide range. For example, the injection nozzles may be placed at various locations and attitudes with respect to the gas stream. Further, where more than one stream is employed, the streams may be placed to cause mutual impingement thereof as, for example, by placing two injection nozzles in opposition.

Where the foam-forming composition is utilized as two or more streams, and where such streams are placed such as to cause mutual impingement, mixing action is believed to be enhanced to such an extent that multicellular particles according to the invention may be obtained without necessarily utilizing a sonic velocity gas stream. Such result would be due to the additive mixing action of impingement and of turbulence due to the gas stream flow. The relative velocity, one to the other, of the two or more streams would affect the degree of mixing or turbulence due to impingement and, depending on the magnitude of this relative velocity, the velocity of the gas stream could be lowered and yet the total cumulative result of gas velocity and impingement could cause sufficient turbulent mixing to produce multicellular particles according to the invention.

The average particle size may be varied from about 1 micron to over 1,000 microns and the cells may be open or closed, according to operating conditions selected according to the use to which the particles are to be put. Gas velocities in the reaction zone at or near sonic velocity result in the formation of multicellular particles and are particularly desirable in maintaining smooth operation. Instead of using spray nozzles to disseminate the resin compositions in the gas stream, dissemination may be effected in other ways, as by the use of rapidly rotating members.

Among the uses of the plastic particle dispersions of the invention are those dependent on the reflective or absorbent power of the dispersions for radiant energy. For example, they may be used to prevent frost damage to crops by preventing the radiation of heat from orchards and the like. They may, of course, be used for the usual purposes of presently available smokes, such as smoke screens, smoke signals, sky writing and the like with the added advantage of the low settling rates due to the low density to size ratios of the dispersed particles in the dispersions of the invention. Other uses will depend on the utilization of the dispersed plastic particles as efficient carriers for reactive substances, such as silver iodide for cloud seeding or insecticides for sanitation or crop protection. For the production of relatively stable dispersions of the particles in gaseous media particle sizes in the range of from about 1 micron to about 100 microns are particularly suitable.

The multicellular plastic particles of the invention have a wide variety of uses.

They may be reconstituted into smoke-like dispersions by redispersion in gaseous carriers, either in the form in which they are collected or after coating or other treatment to vary their color, reflectance or the like for use in signalling, smoke screening, sky writing, sky projection and the like, or to incorporate pesticides for sanitation or crop protection or reactive substances, such as silver iodide for cloud seeding.

The collected particles may be used as light weight fillers, expanders or texturing agents in inks, paints, enamels and other coating compositions, and in rubber and plastic compositions.

They may be used as fillers in paper stock or in paper coating compositions.

They may be used as soil conditioners, either as collected or after incorporating pesticles, plant nutrients or coloring substances.

They may be used as light weight fillers for tires and as pourable, lightweight insulation.

The particles may be collected on a layer or coating of an adhesive or binder composition to provide useful coatings of variable texture, transparency and gloss, and useful coatings may be produced by impinging the gas stream bearing the particles on a collecting surface before the particles are fully hardened.

Depending upon the point in time that the particles are collected, the incompletely cured particles may or may not be fully expanded, and the collection may be accomplished at a time such that the particles collected may be subsequently fully expanded.

I claim:

1. A method of making dispersions of finely divided multicellular solid polymeric organoplastic particles having a plurality of hollow cells therein comprising the steps of injecting a foam-forming composition, said composition being capable of forming a solid polymeric organoplastic foam, into a stream of rapidly moving gas, said gas moving at least at approximately sonic velocity and being at least at a temperature necessary to cause foam-development of the composition, to disperse said composition in said rapidly moving gas stream, and maintaining said dispersed composition in contact with said gas while said composition forms a dispersion of multicellular solid polymeric organoplastic particles having a plurality of hollow cells therein.

2. A method as defined in claim 1 in which different components of the foam-forming composition are separately injected into the stream of gas.

3. A method as defined in claim 2 in which one of the separately injected portions of the foam-forming composition includes a catalyst for the hardening of the polymeric organoplastic.

4. A method of making multicellular solid polymeric organoplastic particles having a plurality of hollow cells therein comprising the steps of injecting a foam-forming composition, said composition being capable of forming a solid polymeric organoplastic foam, into a stream of rapidly moving gas, said gas moving at least at approximately sonic velocity and being at least at a temperature necessary to cause foam-development of the composition, to disperse said composition in said rapidly moving gas stream, maintaining said dispersed composition in contact with said gas while said composition forms a dispersion of multicellular solid polymeric organoplastic particles having a plurality of hollow cells therein, and thereafter collecting the particles.

5. An aerosol comprising a dispersion in a gaseous medium of solid, multicellular, and at least substantially spherical polymeric organoplastic particles having a plurality of hollow cells therein and having an average particle size of from one micron to about one thousand microns.

6. An aerosol according to claim 5 wherein the polymeric organoplastic is a thermoplastic synthetic resin.

7. An aerosol according to claim 5 wherein the polymeric organoplastic is a thermosetting synthetic resin.

8. An aerosol according to claim 5 wherein the polymeric organoplastic is a rubber.

9. A multicellular, solid, and at least substantially spherical polymeric organoplastic particle having an average particle size in the range of from about one micron to about one thousand microns and having a plurality of hollow cells therein and an at least partially closed cell structure.

10. A multicellular, solid, and at least substantially spherical polymeric organoplastic particle having an average particle size in the range of from about one micron to about one thousand microns and having a plurality of hollow cells therein and an at least partially open cell structure.

11. A multicellular, solid, and at least substantially spherical polymeric organoplastic particle having a plurality of hollow cells therein and having a particle size of from one to about one thousand microns.

12. A multicellular particle according to claim 11 wherein the organoplastic particle comprises a thermoplastic resin.

13. A multicellular particle according to claim 11 having a density of from about 0.0012 to about 0.01 gram per cc.

14. A multicellular particle according to claim 11 wherein the organoplastic particle comprises a thermosetting resin.

15. A multicellular particle according to claim 14 wherein the thermosetting resin is selected from the group consisting of urea-formaldehydes, phenol-formaldehydes, urethanes, epoxies and silicones.

References Cited

UNITED STATES PATENTS

| | | | |
|---|---|---|---|
| 3,037,903 | 6/1962 | Baumann et al. | 260—2.5 |
| 3,038,867 | 6/1962 | Czepiel | 260—2.5 |
| 3,210,239 | 10/1965 | Ebert et al. | 260—2.5 |

MURRAY TILLMAN, *Primary Examiner.*

GEORGE F. LESMES, *Examiner.*

M. FOELAK, *Assistant Examiner.*